United States Patent
Smith et al.

(10) Patent No.: US 12,013,493 B2
(45) Date of Patent: Jun. 18, 2024

(54) LIDAR SYSTEM INCLUDING LIGHT EMITTER FOR MULTIPLE RECEIVING UNITS

(71) Applicant: Continental Automotive Systems, Inc., Auburn Hills, MI (US)

(72) Inventors: Elliot Smith, Ventura, CA (US); Jürgen Brugger, Neukirch (DE); Heiko Leppin, Hergensweiler (DE); Jan Michael Masur, Santa Barbara (CA)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 977 days.

(21) Appl. No.: 16/395,558

(22) Filed: Apr. 26, 2019

(65) Prior Publication Data
US 2020/0341116 A1    Oct. 29, 2020

(51) Int. Cl.
*G01S 7/484* (2006.01)
*G01S 17/42* (2006.01)
*G01S 17/89* (2020.01)
*G02B 26/08* (2006.01)

(52) U.S. Cl.
CPC .............. *G01S 7/484* (2013.01); *G01S 17/42* (2013.01); *G01S 17/89* (2013.01); *G02B 26/0833* (2013.01)

(58) Field of Classification Search
CPC ...... G01S 117/42; G01S 17/89; G01S 17/931; G01S 7/4813; G01S 7/4814; G01S 7/4816; G01S 7/484; G01S 7/4972; G01S 17/42; G02B 26/0833
See application file for complete search history.

(56) References Cited

U.S. PATENT DOCUMENTS

| | | |
|---|---|---|
| 6,133,989 A | 10/2000 | Stettner et al. |
| 7,969,558 B2 | 6/2011 | Hall |
| 8,692,980 B2 | 4/2014 | Gilliland et al. |
| 8,736,818 B2 | 5/2014 | Weimer et al. |
| 10,401,865 B1* | 9/2019 | Ulrich ..................... G01S 17/10 |
| 2012/0170024 A1* | 7/2012 | Azzazy ..................... G01J 3/18 356/402 |
| 2016/0266242 A1* | 9/2016 | Gilliland ............... G01S 7/4863 |
| 2018/0188355 A1* | 7/2018 | Bao ....................... G02B 26/126 |
| 2018/0284286 A1* | 10/2018 | Eichenholz ............. G01S 17/89 |
| 2019/0265703 A1* | 8/2019 | Hicok .................. G05D 1/0088 |
| 2020/0191568 A1* | 6/2020 | Lapstun ................. H04N 23/60 |
| 2020/0209355 A1* | 7/2020 | Pacala ..................... G01S 7/484 |

\* cited by examiner

*Primary Examiner* — Maria E Vazquez Colon

(57) ABSTRACT

A system includes photodetectors each having a field of view and reflectors each respectively aimed at one of the fields of view. A beam-steering device is movable to different positions aimed at the different reflectors. A light emitter is aimed at the beam-steering device. The beam-steering device alternates aim between the reflectors to selectively illuminate the different fields of view.

7 Claims, 12 Drawing Sheets

LIDAR SYSTEM INCLUDING LIGHT EMITTER FOR MULTIPLE RECEIVING UNITS

BACKGROUND

A solid-state Lidar system includes a photodetector, or an array of photodetectors, that is essentially fixed in place relative to a carrier, e.g., a vehicle. Light is emitted into the field of view of the photodetector and the photodetector detects light that is reflected by an object in the field of view. For example, a flash Lidar system emits pulses of light, e.g., laser light, into essentially the entire the field of view. The detection of reflected light is used to generate a 3D environmental map of the surrounding environment. The time of flight of the reflected photon detected by the photodetector is used to determine the distance of the object that reflected the light.

The solid-state Lidar system may be mounted on a vehicle to detect objects in the environment surrounding the vehicle and to detect distances of those objects for environmental mapping. The output of the solid-state Lidar system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

Some applications, e.g., in a vehicle, include several Lidar systems. For example, the multiple system may be aimed in different directions and/or may detect light at different distance ranges, e.g., a short range and a long range. Packaging constraints, e.g., design constraints of a vehicle, may place constraints on the size and/or location of these multiple Lidar systems. Similar constraints may place constraints on factors that affect cooling of the Lidar system, e.g., cooling of a light emitter of the Lidar system.

DETAILED DESCRIPTION

Figure 1:
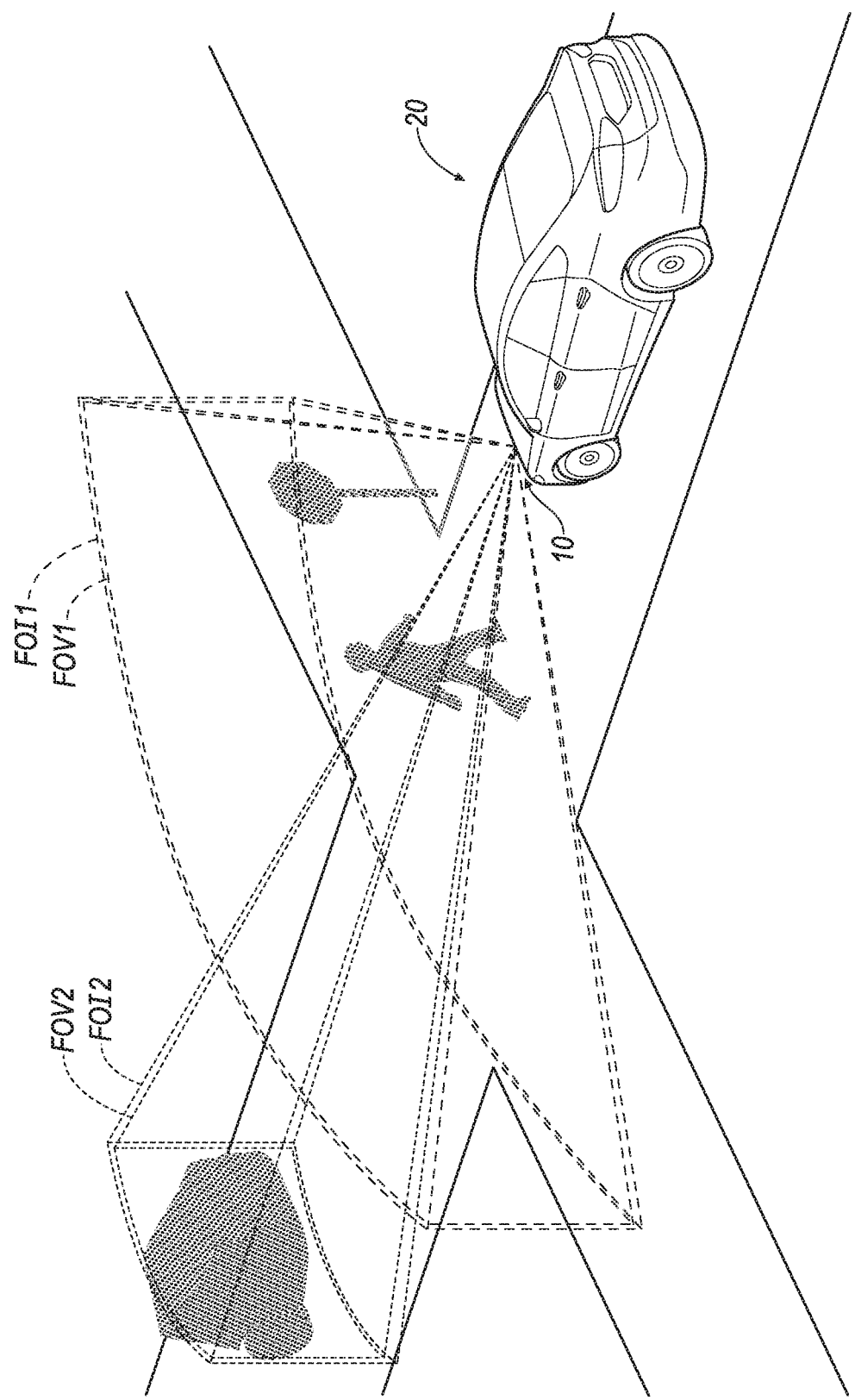
FIG. 1 is a perspective view of a vehicle with a Lidar system showing a 3D map of the objects detected by the Lidar system.
Figure 2:
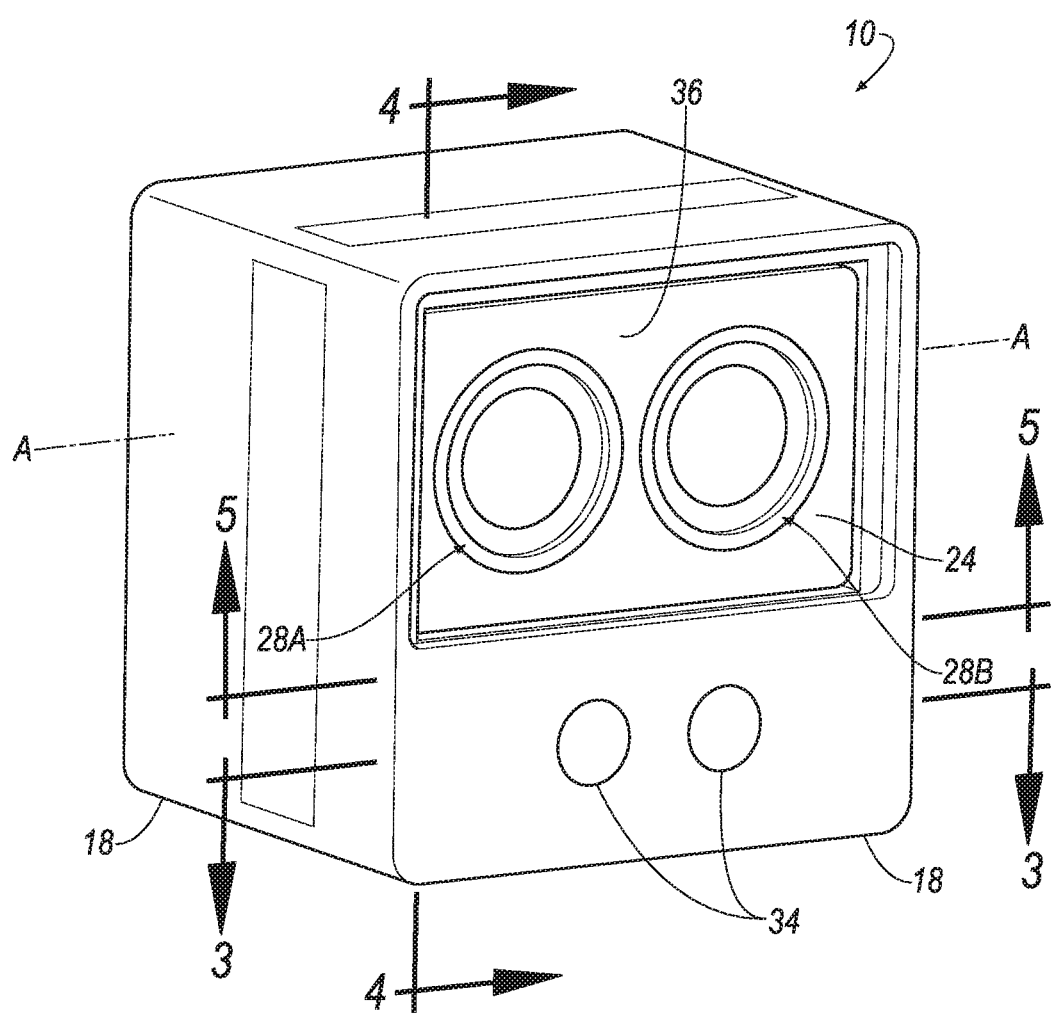
FIG. 2 is a perspective view of the Lidar system including a casing and a housing that houses a photodetector and pivots relative to the casing.

With reference to the Figures, wherein like numerals indicate like parts throughout the several views, a system 10 is generally shown. The system 10 is a light detection and ranging (Lidar) system. The system 10 includes at least two photodetectors 12 each having a field of view FOV, e.g., a first photodetector 12A having a first field of view FOV and a second photodetector 12B having a second field of view FOV. The system 10 includes a reflector 14 aimed at each field of view FOV, e.g. a first reflector 14A aimed at the first field of view FOV and a second reflector 14B aimed at the second field of view FOV. The system 10 includes a beam-steering device 16 movable to various positions aimed at the reflectors 14, e.g., between a first position aimed at the first reflector 14A and a second position aimed at the second reflector 14A. The system 10 includes a light emitter 18 aimed at the beam-steering device 16. The system 10 detects the emitted light that is reflected by an object in the fields of view FOV, e.g., pedestrians, street signs, vehicle 20s, etc.

The beam-steering device 16 may be moved between the various positions to selectively aim the light from the light emitter 18 at the different reflectors 14. For example, the beam-steering device 16 may aimed at the first reflector 14A for illuminating the first field of view FOV and aimed at the second reflector 14B for illuminating the second field of view FOV. Accordingly, the one light emitter 18 may selectively illuminate the various fields of view FOV. This eliminates a separate light emitter 18 for each fields of view FOV, which reduces cost, creates additional packaging options, and reduces cooling demand. The beam-steering device 16 alternates between the various positions. For example, the beam-steering device 16 may consecutively switch between the first and second positions to illuminate the first field of view FOV and the second field of view FOV, respectively, as shown in FIGS. 1-6. As another example of alternating, the beam-steering device 16 may move to positions in addition to the first and second positions to aim the light from the light emitter 18 into other fields of view FOV, as shown in FIGS. 7A-8C and described further below.

The system 10 is shown in FIG. 1 as being mounted on a vehicle 20. In such an example, the system 10 is operated to detect objects in the environment surrounding the vehicle 20 and to detect distance of those objects for environmental mapping. The output of the system 10 may be used, for example, to autonomously or semi-autonomously control operation of the vehicle 20, e.g., propulsion, braking, steering, etc. Specifically, the system 10 may be a component of or in communication with an advanced driver-assistance system 10 (ADAS) of the vehicle 20. The system 10 may be mounted on the vehicle 20 in any suitable position (as one example, the system 10 is shown on the front of the vehicle 20 and directed forward). The vehicle 20 may have more than one system 10 and/or the vehicle 20 may include other object detection systems, including other Lidar systems. The vehicle 20 is shown in FIG. 1 as including a single system 10 aimed in a forward direction merely as an example. The vehicle 20 shown in the Figures is a passenger automobile. As other examples, the vehicle 20 may be of any suitable manned or un-manned type including a plane, satellite, drone, watercraft, etc.

The system 10 may be a solid-state Lidar system. In such an example, the system 10 is stationary relative to the vehicle 20 during illumination and light detection. For example, the system 10 may include a casing 22 that is fixed relative to the vehicle 20, i.e., does not move relative to the component of the vehicle 20 to which the casing 22 is attached, and a silicon substrate of the system 10 is supported by the casing 22.

As a solid-state Lidar system, the system 10 may be a flash Lidar system. In such an example, the system 10 emits pulses of light into the field of view FOV. More specifically, the system 10 may be a 3D flash Lidar system that generates a 3D environmental map of the surrounding environment, as shown in part in FIG. 1. An example of a compilation of the data into a 3D environmental map is shown in the fields of view FOV and the fields of view FOV in FIG. 1.

Figure 9:
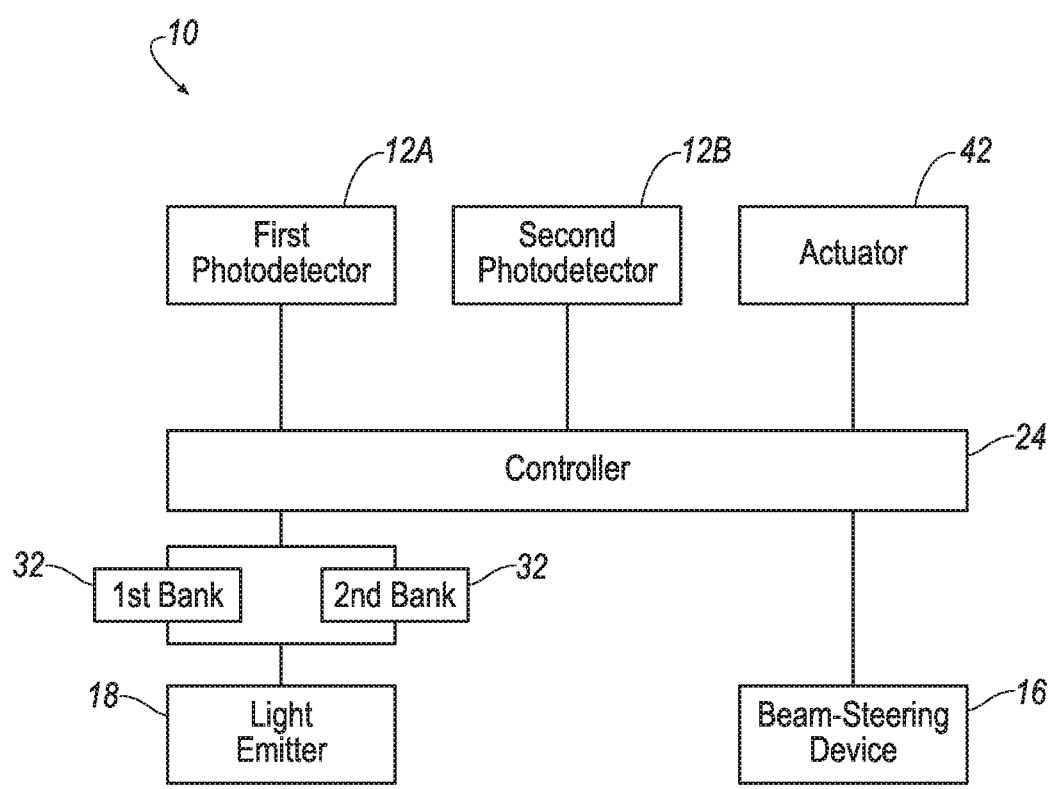
FIG. 9 is a block diagram of the Lidar system of FIGS. 1-5.

With reference to FIG. 9, the system 10 may include a controller 24, i.e., a computer, the light emitter 18, the beam-steering device 16, a plurality of light-transmitting units 26, and a plurality of light-receiving units 28. As described further below, the light-transmitting units 26 include the reflectors 14, respectively, and the light-receiving units 28 include the photodetectors 12, respectively. The beam-steering device 16 selectively aims light from the light emitter 18 to the light-transmitting units 26 to selectively aim the light into the fields of view FOV for reception by the respective light-receiving unit 28.

The controller 24 is in communication with the light emitter 18 and the beam-steering device 16 for controlling the emission of light from the light emitter 18 and the aim of the beam-steering device 16 at the light-transmitting units 26. The controller 24 may be in communication with the light-receiving units 28, e.g., the photodetector 12, for receiving detection of reflected light in the respective fields of view FOV.

Specifically, the controller 24 may instruct the light emitter 18 to emit light and substantially simultaneously initiates a clock. When the light is reflected, i.e., by an object in the field of view FOV, the photodetector 12 detects the reflected light and communicates this detection to the controller 24, which the controller 24 uses to identify object location and distance to the object (based time of flight of the detected photon using the clock initiated at the emission of light from the light source). Each photodetector 12 may operate in this fashion. The controller 24 uses these outputs from the photodetectors 12 to create the environmental map and/or communicates the outputs from the photodetectors 12 to the vehicle 20, e.g., components of the ADAS, to create the environmental map. Specifically, the controller 24 continuously repeats the light emission and detection of reflected light for building and updating the environmental map.

The controller 24 may be a microprocessor-based controller or field programmable gate array (FPGA), or a combination of both, implemented via circuits, chips, and/or other electronic components. In other words, the controller 24 is a physical, i.e., structural, component of the system 10. For example, the controller 24 may include a processor, memory, etc. The memory of the controller 24 may store instructions executable by the processor, i.e., processor-executable instructions, and/or may store data. The controller 24 may be in communication with a communication network of the vehicle 20 to send and/or receive instructions from the vehicle 20, e.g., components of the ADAS.

With reference to FIG. 1 the light emitter 18 emits light into fields of illumination FOI for detection by the photodetectors 12 when the light is reflected by an object in the respective field of view FOV. The light emitter 18 may be, for example, a laser. The light emitter 18 may be, for example, a semiconductor laser. In one example, the light emitter 18 is a vertical-cavity surface-emitting laser (VCSEL). As another example, the light emitter 18 may be a diode-pumped solid-state laser (DPSSL). As another example, the light emitter 18 may be an edge emitting laser diode. The light emitter 18 may be designed to emit a pulsed flash of light, e.g., a pulsed laser light. Specifically, the light emitter 18, e.g., the VCSEL or DPSSL or edge emitter, is designed to emit a pulsed laser light. The light emitted by the light emitter 18 may be, for example, infrared light. Alternatively, the light emitted by the light emitter 18 may be of any suitable wavelength. The system 10 may include any suitable number of light emitters 18 and light-receiving units 28, i.e., one or more in the casing 22.

Figure 3:
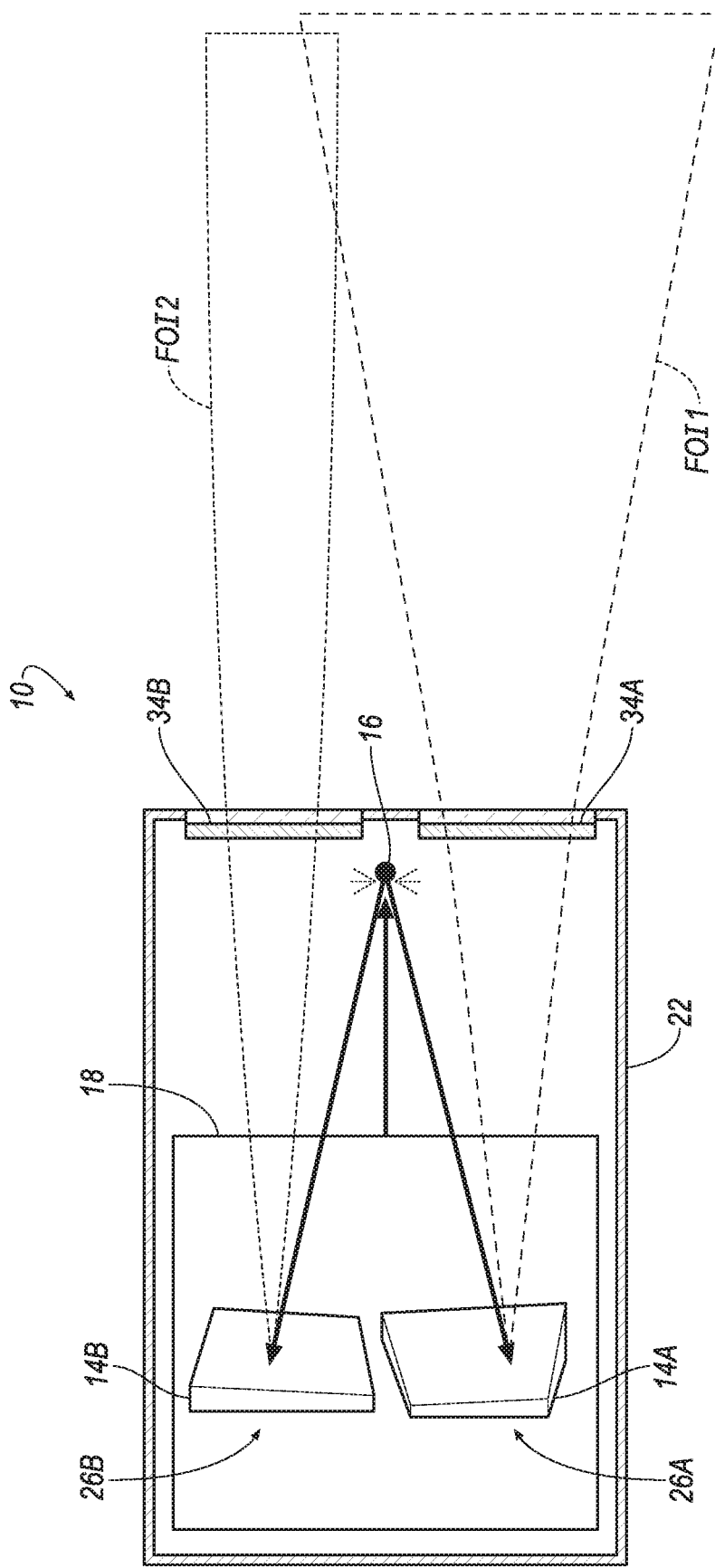
FIG. 3 is a cross-sectional view along line 3 in FIG. 2.
Figure 7A:
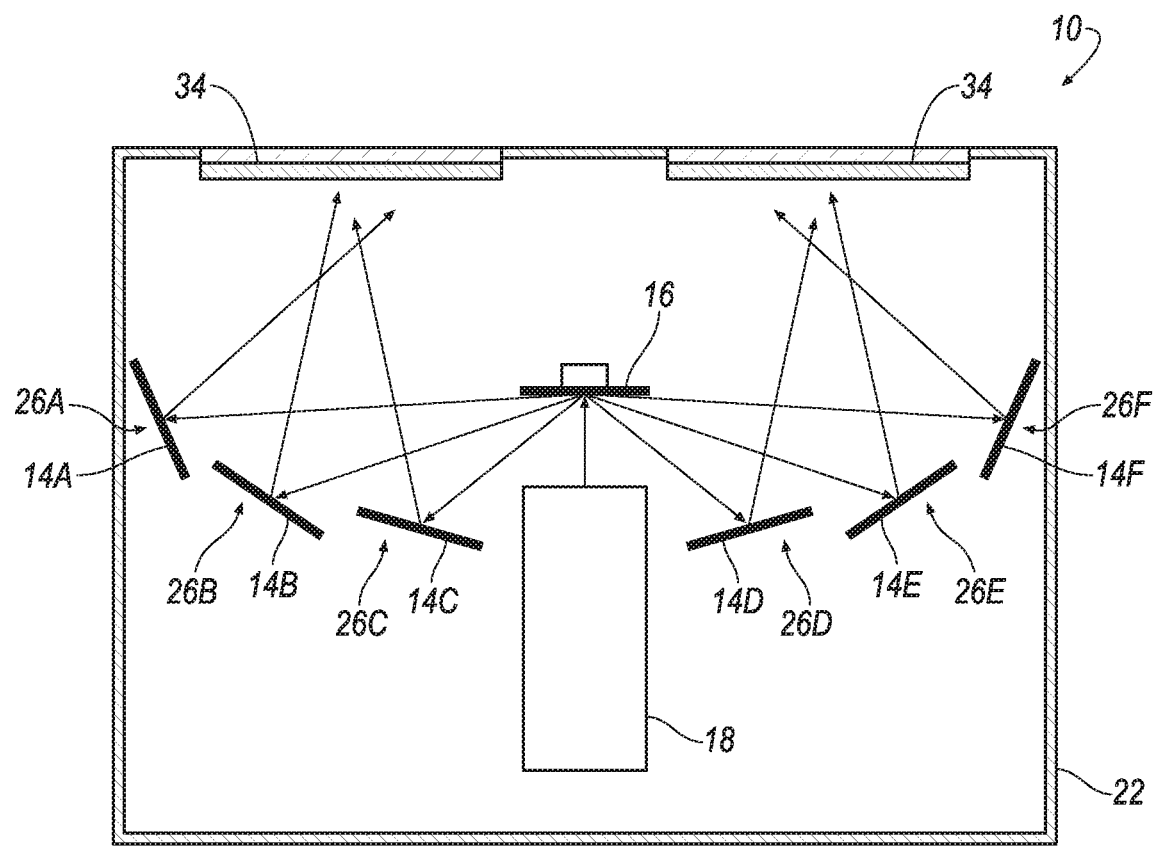
FIG. 7A is a cross-sectional view of another embodiment of the Lidar system.
Figure 7B:
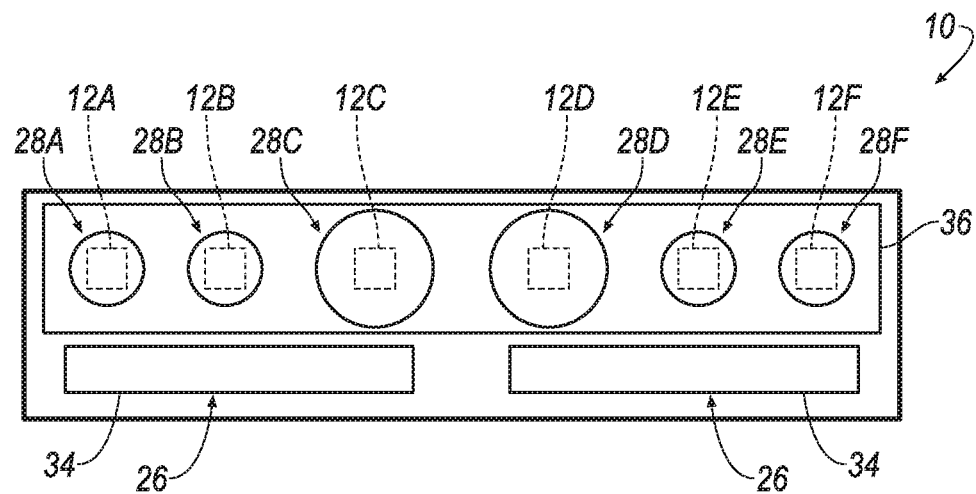
FIG. 7B is a front view of the embodiment of FIG. 7A.
Figure 7C:
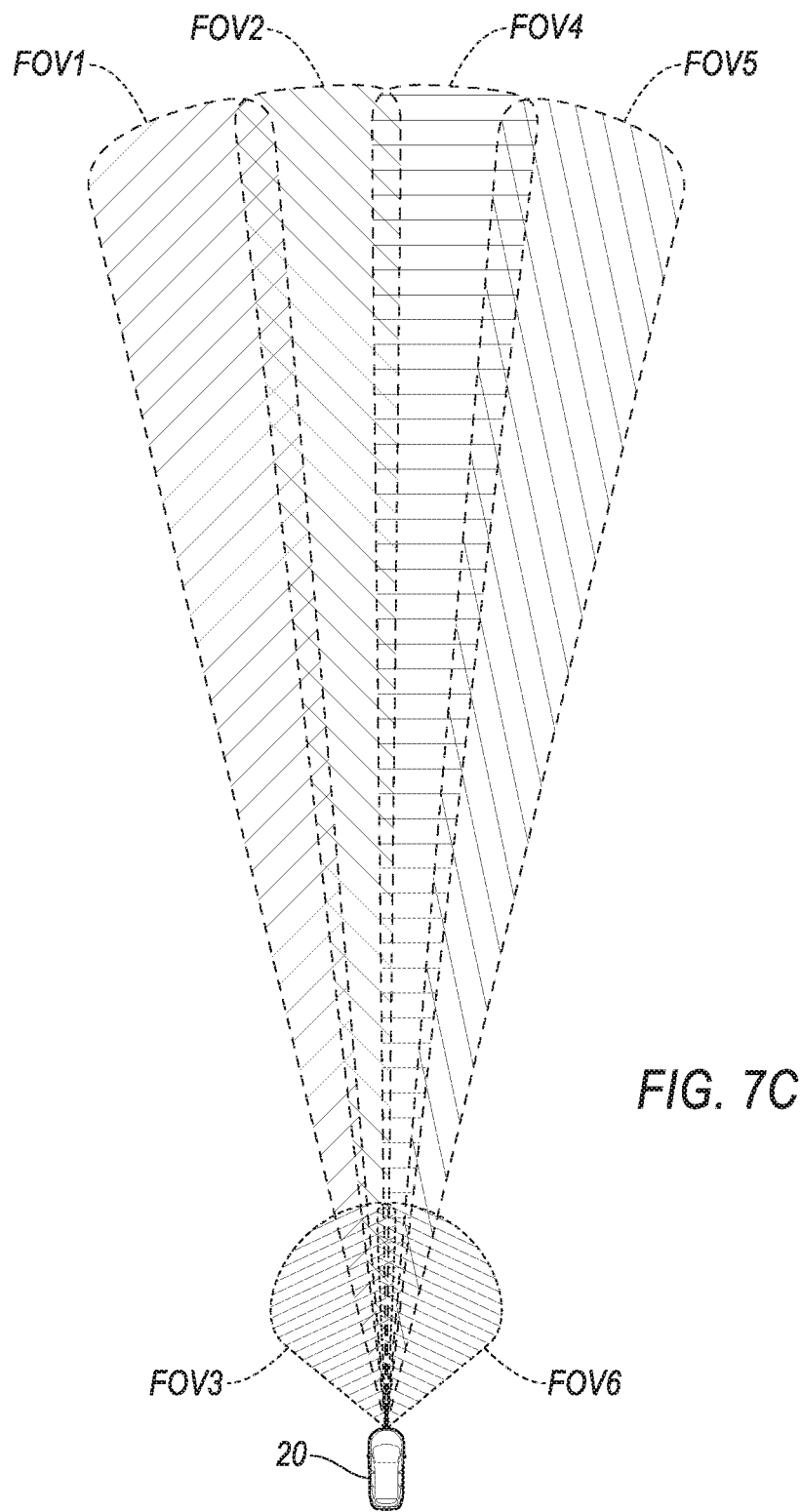
FIG. 7C is a schematic of the operation of the embodiment in FIGS. 7A-B.
Figure 8A:
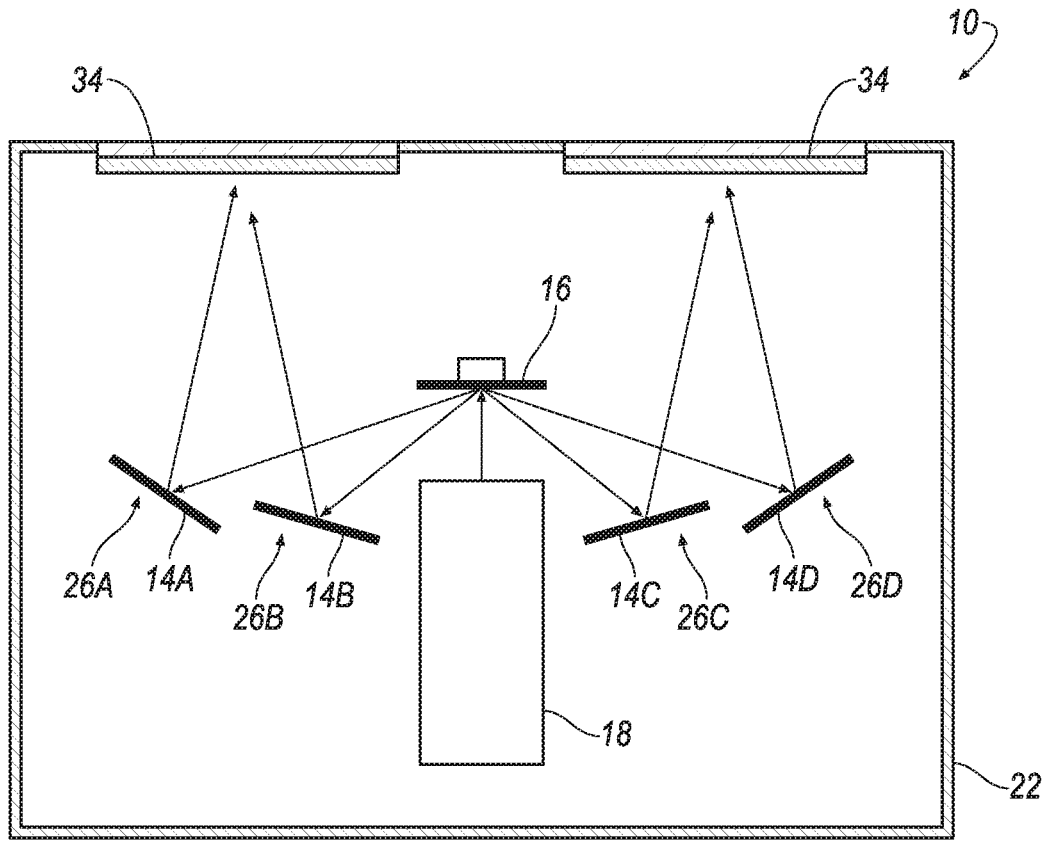
FIG. 8A is a cross-sectional view of another embodiment of the Lidar system.
Figure 8B:
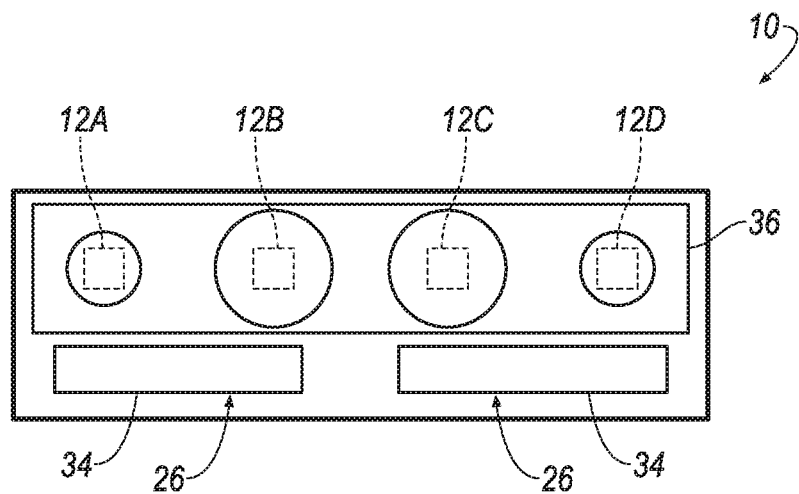
FIG. 8B is a front view of the embodiment of FIG. 8A.
Figure 8C:
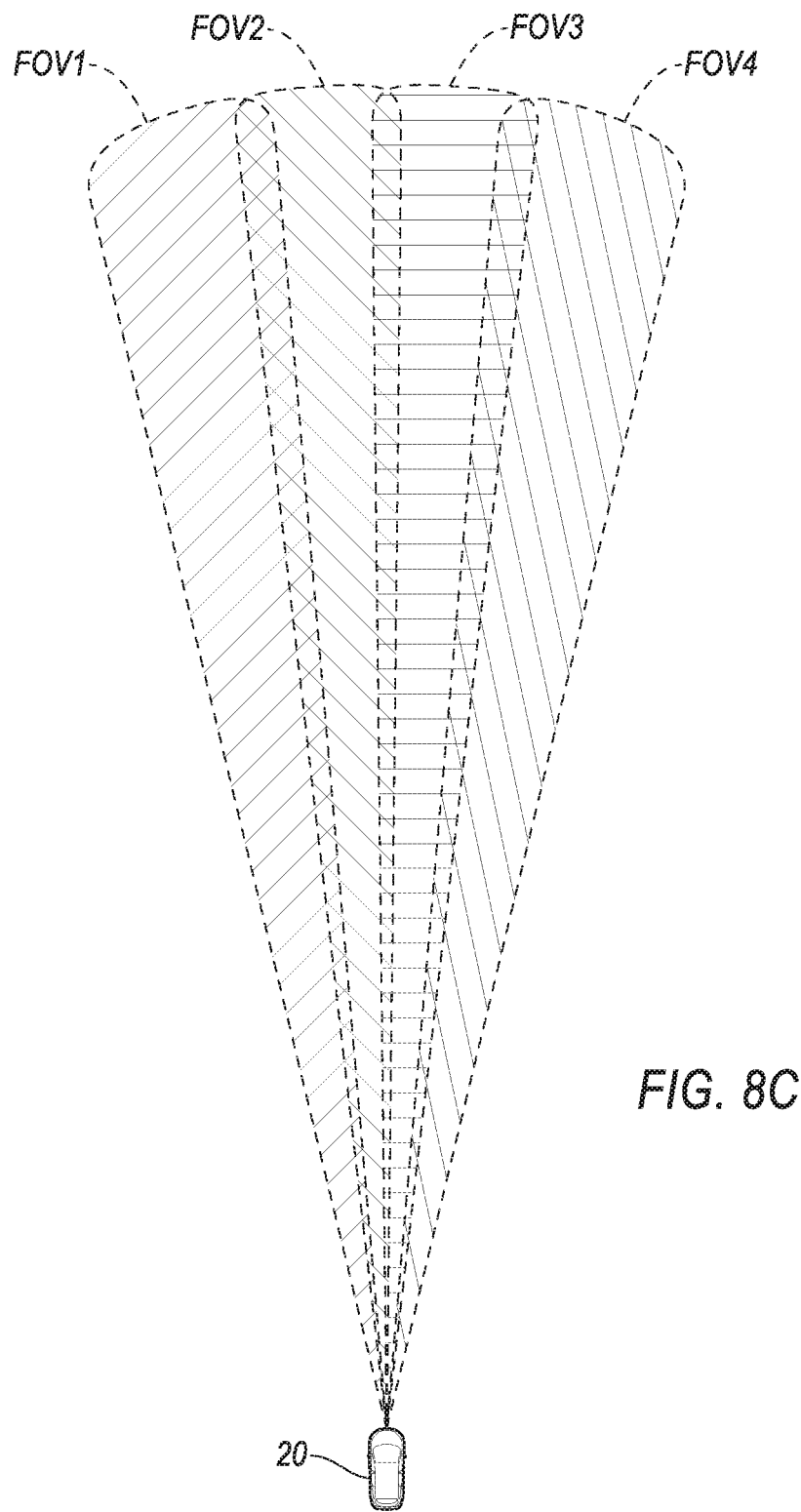
FIG. 8C is a schematic of the operation of the embodiment in FIGS. 8A-B.

As set forth above, the light emitter 18 is aimed at the beam-steering device 16 (see FIGS. 3, 7A, 8A). In other words, light from the light emitter 18 is reflected by the beam-steering device 16. The light emitter 18 may be aimed directly at the beam-steering device 16 or may be aimed indirectly at the beam-steering device 16 through intermediate reflectors/deflectors, optics, etc.

Figure 4:
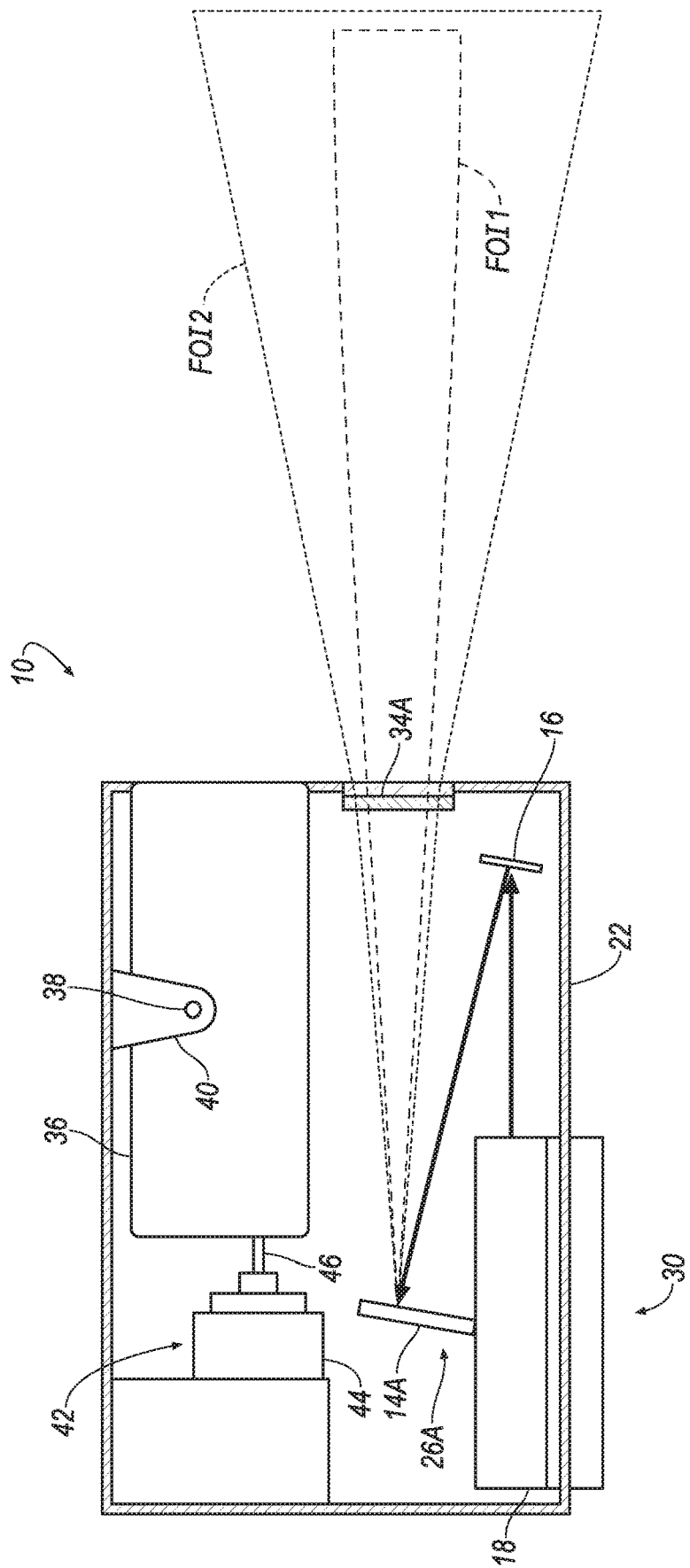
FIG. 4 is a cross-sectional view along line 4 in FIG. 2.
Figure 5:
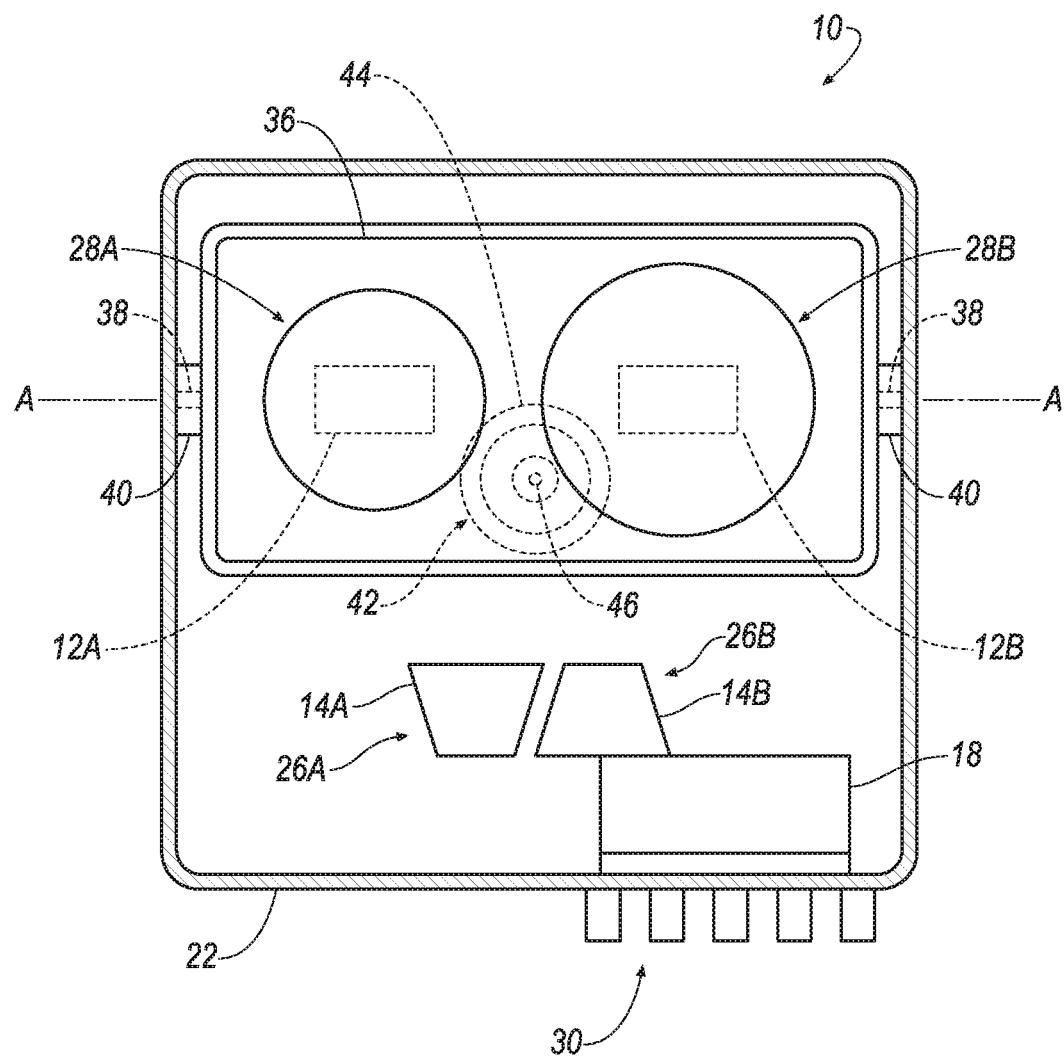
FIG. 5 is a front view of the Lidar system of FIG. 2.

With reference to FIGS. 3-5, the light emitter 18 may be stationary relative to the casing 22. In other words, the light emitter 18 does not move relative to the casing 22 during operation of the system 10, e.g., during light emission. The light emitter 18 may be mounted to the casing 22 in any suitable fashion such that the light emitter 18 and the casing 22 move together as a unit.

The system 10 includes one or more cooling devices 30 for cooling the light emitter 18. For example, the system 10 may include a heat sink (shown in FIGS. 2 and 5) on the casing 22 adjacent the light emitter 18. The heat sink may include, for example, a wall adjacent the light emitter 18 and fins extending away from the wall exterior to the casing 22 for dissipating heat away from the light emitter 18. The wall and/or fins, for example, may be material with relatively high heat conductivity. The light emitter 18 may, for example, abut the wall to encourage heat transfer. In addition, or in the alternative, the fins, the system 10 may include additional cooling devices 30, e.g. thermal electric coolers (TEC).

The system 10 may include multiple banks 32 of capacitors (FIG. 9) electrically connected to the light emitter 18. In the example shown in FIG. 9, the system 10 includes two banks 32 of capacitors both in electrical communication with the light emitter 18. Each bank 32 of capacitors may be dedicated to one of the positions of the beam-steering device 16. In other words, the first bank 32 may be used to power the light emitter 18 when the beam-steering device 16 is in the first position and the second bank 32 may be used to power the light emitter 18 when the beam-steering device 16 is in the second position. In such an example, the multiple banks 32 may increase the speed of operation of the light emitter 18 to increase the rapidity at which the beam-steering device 16 can switch between the various fields of illumination FOI. The system 10 may include additional banks 32 of capacitors in examples include additional positions.

As set forth above, the system 10 includes light-transmitting units 26. For example, the system 10 may include one light-transmitting unit 26 for each light-receiving unit 28, i.e., each photodetector 12. Each light-transmitting unit 26 may be dedicated to one light-receiving unit 28. In other words, each light-transmitting unit 26 may be aimed at one light-receiving unit 28, e.g., the photodetector 12 of the light-receiving unit 28. Specifically, the field of illumination FOI of the light-transmitting unit 26 overlaps the field of view FOV of the respective photodetector 12, e.g., the field of illumination FOI is centered on the field of view FOV.

As an example, the system 10 shown in FIGS. 1-6 includes a first and second light-transmitting units 26A, 26B and a first and second light-receiving units 28A, 28B (including the first and second photodetectors 12A, 12B, respectively). The first light-transmitting unit 26A is aimed at the field of view FOV of the first photodetector 12A and the second light-transmitting unit 26B is aimed at the field of view FOV of the second photodetector 12B. Similarly, the system 10 in FIGS. 7A-C and 8A-C include six and four light-transmitting units 26, respectively, and six and four light-receiving units 28, respectively. A common numeral is used to identify the light-transmitting units 26 and separate alphabetical identifiers are used to distinguish the separate light-transmitting units 26. The separate light-transmitting units 26 may be identical or different.

With reference to FIGS. 3-5, as set forth above, the system 10 includes reflectors 14 aimed at the fields of view FOV, respectively. In other words, the field of illumination FOI from the reflector 14 overlaps the field of view FOV of the respective photodetector 12, e.g., the field of illumination FOI is centered on the field of view FOV. The reflectors 14 may directly reflect light from the beam-steering device 16 to the field of illumination FOI or may indirectly reflect light to the field of illumination FOI, i.e., through intermediate reflectors 14/deflectors, optics, etc. As another example, in the alternative to the reflectors 14, the laser may be directly aimed at the beam-steering device 16.

As an example shown in FIGS. 1-5, the first reflector 14A is aimed at the first field of view FOV and the second reflector 14B is aimed at the second field of view FOV. Similarly, the examples in FIGS. 7A-C and 8A-C include additional reflectors 14. A common numeral is used to identify the reflectors 14 and separate alphabetical identifiers are used to distinguish the separate reflectors 14. The separate reflectors 14 may be identical or different.

Each reflector 14 may be dedicated to one field of view FOV. In other words, the beam-steering device 16 is aimed at one reflector 14 for illuminating the field of view FOV of one photodetector 12, and the beam-steering device 16 moves aim between the various reflectors 14 for illuminating the various fields of view FOV. At least some of the reflectors 14 may be aimed in different directions to create fields of illumination FOI that are not aligned with each other. As another example, some of the reflectors 14 may be aimed in the same direction to provide overlapping fields of illumination FOI, in which case one field of illumination FOI may be longer than the other, e.g., for long-range and short-range detection.

The reflectors 14 may be fixed relative to the casing 22. The reflectors 14 may be, for example, diffusers, such as reflective diffusers.

The light-transmitting units 26 may include a refractive diffuser 34 for each reflector 14 (FIG. 3). In other words, the reflector 14 is aimed at the refractive diffuser 34 and the refractive diffuser 34 diffuses light into the field of illumination FOI.

As set forth above, the beam-steering device 16 switches aim between the light-transmitting units 26. A "beam-steering device" is a structural component of a Lidar system. The beam-steering device 16 is controlled by the controller 24, i.e., the controller 24 instructs the beam-steering device 16 to move aim from one light-transmitting unit 26 to another light-transmitting unit 26. For example, the beam-steering device 16 is movable from a first position aimed at the first reflector 14A and a second position aimed at the second reflector 14B, and so on for additional positions and reflectors 14. Light is reflected by the beam-steering device 16 to the light-transmitting unit 26 and to the field of illumination FOI. The beam-steering device 16 adjustably reflects the light emitted from the light emitter 18. In other words, a position of the beam-steering device 16 is adjusted to move the aim of the beam-steering device 16 between the light-transmitting units 26. The adjustment of the beam-steering device 16 may include a vertical component and/or a horizontal component.

As one example, the beam-steering device 16 includes an active mirror, i.e., a movable mirror, that is adjustable to selectively aim light from the light emitter 18 to one of the light-transmitting units 26 and into the respective field of illumination FOI. In other words, the light emitter 18 is positioned to emit light at the active mirror directly from the light emitter 18 or indirectly from the light emitter 18 through intermediate components.

Specifically, the active mirror may be a micromirror. For example, the beam-steering device 16 may be a micro-electro-mechanical systems (MEMS) mirror. As an example, the beam-steering device 16 may be a digital micromirror device (DMD). The MEMS mirror may include one mirror or may include an array of mirrors that are capable of being tilted to deflect light. As another example, the MEMS mirror may include one or more mirrors each on a gimbal that is tilted, e.g., by application of voltage.

In addition to or in the alternative to the MEMS mirror, the beam-steering device 16 may include a diffuser. As another example, the beam-steering device 16 may be a liquid-crystal solid-state device, which can steer the light beam through a change in index of refraction due to an applied voltage.

As set forth above, the system 10 includes light-receiving units 28, each of which includes one of the photodetectors 12. The light-receiving unit 28 may include receiving optics, e.g., lenses, filters, etc. The system 10 may include any suitable number of light-receiving units 28, i.e., two or more. As examples, the system 10 includes two light-receiving units 28 in FIGS. 1-6, six light-receiving units 28 in FIGS. 7A-C, and four light-receiving units 28 in FIGS. 8A-C. Each of the light-receiving units 28 may be in the casing 22. As set forth above, the system 10 may include the same number of light emitters 18 and light-receiving units 28 with each light emitter 18 corresponding to one light-receiving unit 28. A common numeral is used to identify the light-receiving units 28 and separate alphabetical identifiers are used to distinguish the separate light-receiving units 28. The separate light-receiving units 28 may be identical or different.

Each photodetector 12 has a field of view FOV, e.g., the first photodetector 12A has a first field of view FOV, the second photodetector 12B has a second field of view FOV, etc. At least some of the photodetectors 12 may be aimed in different directions. As another example, some reflectors 14 may be aimed in the same direction to provide overlapping fields of view FOV, in which case one field of view FOV may be longer than the other, e.g., for long-range and short-range detection. A common numeral is used to identify the photodetectors 12 and separate alphabetical identifiers are used to distinguish the separate photodetectors 12. The separate photodetectors 12 may be identical or different.

For the purpose of this disclosure "photodetector" includes a single photodetector or an array of photodetectors (including 1D arrays, 2D arrays, etc.). The photodetector 12 may be, for example, an avalanche photodiode detector or PIN detector. As one example, the photodetector 12 may be a single-photon avalanche diode (SPAD). The field of view FOV is the area in which reflected light may be sensed by the photodetector 12. Light reflected in the field of view FOV is reflected to the photodetector 12, e.g., through receiving optics.

As set forth above, each light-transmitting unit 26 has a field of illumination FOI. The field of illumination FOI is the area exposed to light that is emitted from the light-transmitting unit 26. The field of illumination FOI of the light-transmitting unit 26 overlaps the field of view FOV of the corresponding light-receiving unit 28 (i.e., the photodetector 12), and vice-versa. In other words, as least part of the field of view FOV and at least part of the field of illumination FOI occupy the same space such that an object in the overlap will reflect light from the field of illumination FOI back to the photodetector 12. The field of illumination FOI may be smaller than, larger than, or substantially match the same size as the field of view FOV ("substantially match" is based on manufacturing capabilities and tolerances of the light-transmitting unit 26 and the light-receiving unit 28).

The system 10 aligns the field of view FOV of the photodetector 12 and the field of illumination FOI of the respective light-transmitting unit 26. In other words, the system 10 positions the field of view FOV and the field of illumination FOI to a desired relative position, vertically and optionally horizontally. As one example, the field of view FOV and the field of illumination FOI are "aligned" when positioned such that the maximum intensity of reflected light in the field of view FOV is detected by the photodetector 12. The field of view FOV and the field of illumination FOI may be centered to the positions that provide the maximum detected intensity. As another example, the field of illumination FOI and the field of view FOV may be centered in order to optimize the horizon at the desired level of the scene.

The system 10 independently adjusts the vertical and/or horizontal aim of the field of illumination FOI and the vertical aim of the field of view FOV to align the field of illumination FOI and the field of view FOV. This alignment may be performed repeatedly and in the field, i.e., during use of the system 10, such that the system 10 can recalibrate the relative positions of the field of illumination FOI and field of view FOV in the field, e.g., before, during, and/or after operation. For example, the system 10 may be mounted on a vehicle 20 and the alignment of the field of illumination FOI and the field of view FOV may be performed at any suitable time, e.g., before, during, and/or after operation of the vehicle 20. As examples, changes in the ride-height and/or angle of the vehicle 20 may be caused by changes in weight, center of gravity of the vehicle 20. This may be caused by, for example, varying weight, location, and/or age of occupants, varying weight and/or location of cargo, changes in an active-suspension system of the vehicle 20, changes in an active-ride-handling system of the vehicle 20, etc. In such an event, the field of view FOV may be adjusted to a desired vertical position, and the field of illumination FOI may be independently adjusted to align the field of illumination FOI with the field of view FOV. Specifically, due to the requirement of a high-resolution Lidar system, the height of the vertical aim of the field of view FOV may be limited, and the system 10 allows for adjustment of the vertical aim of the system 10. This improves the system 10 requirements on the field of view FOV. The system 10 adjusts the field of illumination FOI to align with the field of view FOV.

For example, with reference to FIGS. 1-5, the system 10 includes a housing 36 that supports the photodetectors 12. In other words, the photodetectors 12 are fixed relative to the housing 36 and move as a unit with the housing 36. The housing 36 is pivotally supported about a horizontal axis A by the casing 22. Accordingly, the housing 36 can be pivoted (i.e., tilted, swiveled, etc.) relative to the housing 36 to simultaneously adjust the vertical aim of the photodetectors 12. Specifically, the housing 36 may be pivotally engaged with the casing 22, i.e., directly in contact with the housing 36, or may be coupled to the housing 36 through an intermediate component.

Specifically, the housing 36 is pivotable relative to the casing 22 about a horizontal axis A, i.e., can swivel, tilt, etc., about the horizontal axis A. Specifically, with reference to FIGS. 4 and 5, horizontal pivot points 38, i.e., pivot points 38 that allow for pivoting about a horizontal axis A, connect the housing 36 to the casing 22. The horizontal pivot points 38 are spaced from each other along a horizontal axis A. The casing 22 and/or the housing 36 may include brackets 40 that support the horizontal pivot points 38.

The housing 36 may be horizontally fixed to the casing 22, i.e., does not move relative to the casing 22 about a vertical axis. As another example, the housing 36 may be movable relative to the casing 22 about a vertical axis to horizontally selectively steer the field of illumination FOI, and in such an example, the housing 36 may be movable through a fixed range of angles, e.g., less than 180°. In other words, system 10 is not a 360° scanning system 10.

The system 10 may include an actuator 42 (FIGS. 4 and 5) between the housing 36 and the casing 22. The actuator 42 is configured to pivot the photodetector 12 relative to the casing 22, i.e., to vertically adjust the photodetector 12. The actuator 42 is between the housing 36 and the casing 22 for pivoting the housing 36 relative to the casing 22. For example, the actuator 42 may be fixed to the casing 22 and the housing 36 to move the casing 22 and the housing 36 relative to each other about the horizontal pivot points 38.

The actuator 42 may be, for example, an electric motor. As one example, the actuator 42 may include a base 44 fixed to one of the casing 22 and the housing 36 and a plunger 46 fixed to the other of the casing 22 and the housing 36. The actuator 42 may be powered to retract the plunger 46 into the base 44 or extend the plunger 46 from the base 44 to move the housing 36 relative to the casing 22. In such an example, the actuator 42 is spaced from the horizontal pivot points 38 such that force exerted between the casing 22 and the housing 36 by the actuator 42 moves the casing 22 and the housing 36 about the horizontal pivot points 38. As another example, the actuator 42 may provide a rotary input to the housing 36. For example, the actuator 42 may be between the housing 36 and the casing 22 at one or both horizontal pivot points 38 and may exert a rotational force at the pivot point 38 to rotate the housing 36 relative to the casing 22.

The beam-steering device 16 operable to align the field of illumination FOI of each light-transmitting unit 26 with the field of view FOV of the respective photodetector 12. Specifically, the beam-steering device 16 steer the respective light beam vertically, and optionally horizontally, based on the position of the beam-steering device 16.

With reference to FIGS. 2-5, the casing 22 may, for example, enclose the other components of the system 10 and may include mechanical attachment features to attach the casing 22 to the vehicle 20 and electronic connections to connect to and communicate with electronic systems of the vehicle 20, e.g., components of the ADAS. The casing 22, for example, may be plastic or metal and may protect the other components of the system 10 from environmental precipitation, dust, etc. The system 10 may be a unit. In other words, the light source, the photodetectors 12, and the controller 24 may be supported by the casing 22.

As set forth above, the controller 24 is schematically shown in FIG. 9. The controller 24, i.e., the processor of the controller 24, is programmed to execute instructions stored in memory of the controller 24.

The controller 24 is programmed to control the selective illumination of the various fields of view FOV, e.g., to switch illumination between the fields of view FOV of the photodetectors 12. Specifically, the controller 24 is programmed to switch the beam-steering device 16 between the different positions, e.g., the first position and the second position, and to reflect light from the light emitter 18 in the different positions.

The controller 24 is programmed to aim the beam-steering device 16 to different positions for selectively reflecting light at one of the light-transmitting units 26. The controller 24 is also programmed to generate light from the light emitter 18 in each position to illuminate the field of view FOV associated with the position of the beam-steering device 16. For example, in the example shown in FIGS. 1-5, the controller 24 is programmed to move beam-steering device 16 to the first position aimed at a first reflector 14A and to the second position aimed at the second reflector 14B, and the controller 24 is programmed to generate light from the light emitter 18 in the first position to reflect the light from the first reflector 14A into the first field of view FOV and in the second position to reflect the light from the first reflector 14B into the second field of view FOV. Similarly, in FIGS. 7A-C, the controller 24 is programmed for six positions, and in FIGS. 8A-C, the controller 24 is programmed for four positions.

Figure 6:
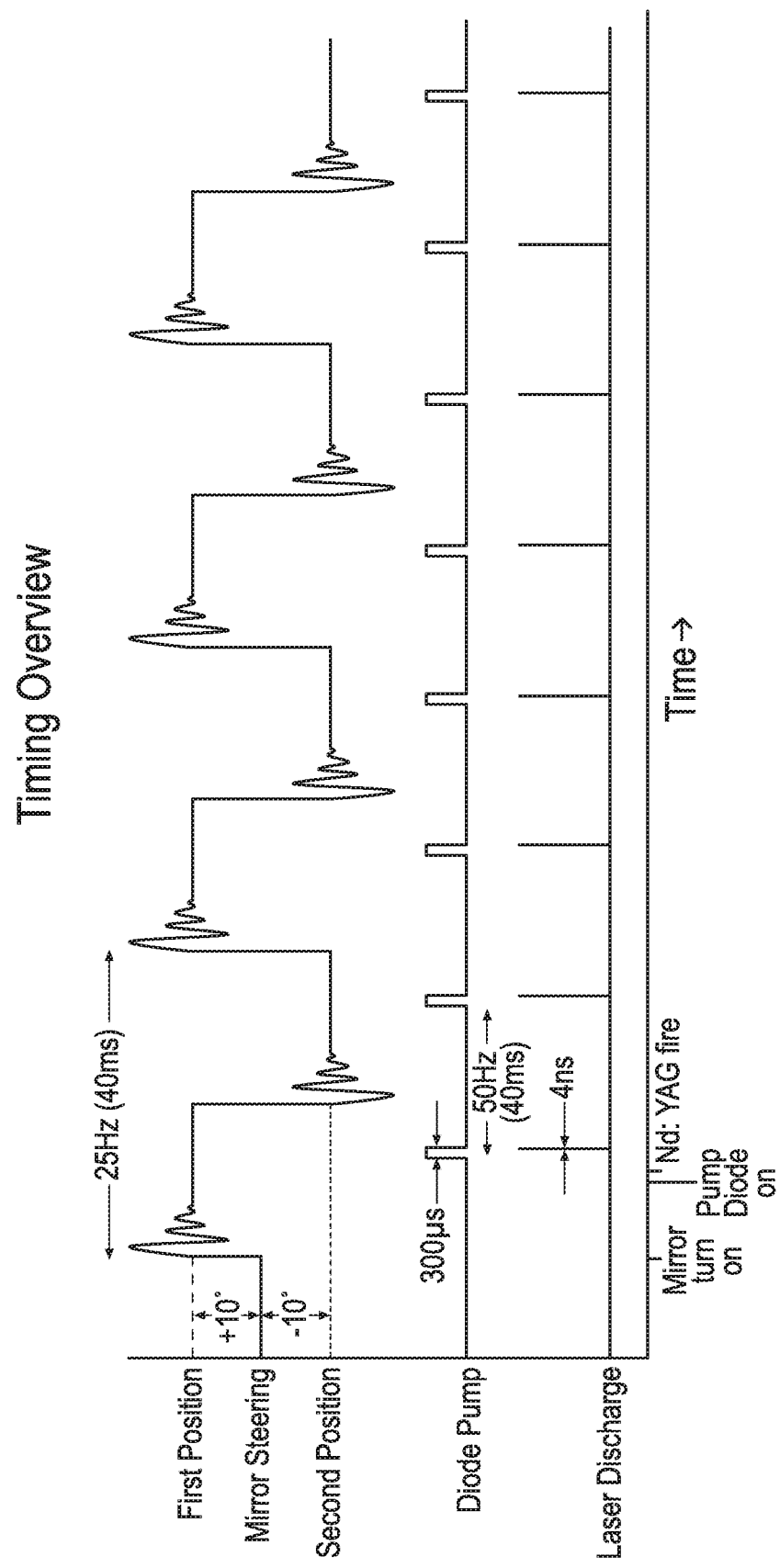
FIG. 6 is a timing diagram for the Lidar system of FIGS. 1-5.

The controller 24 is programmed to alternate between the positions. In other words, the controller 24 moves the beam-steering device 16 to alternate between the positions. This allows for the fields of view FOV to be alternately illuminated. For example, FIG. 6 shows the timing diagram between for the example shown in FIGS. 1-5. FIG. 6 shows the beam-steering device 16 moving between the first and second positions and discharging the light emitter 18 at each position.

The controller 24 is programmed to receive data from the photodetectors 12 indicating detection of light from the light emitter 18 that was reflected by an object in the field of illumination FOI. As described above, this data is used for environmental mapping.

The controller 24 is programmed to adjust the vertical aim of the photodetectors 12 (i.e., to vertically adjust field of view FOV) and the vertical aim, and optionally the horizontal aim, of the beam-steering device 16. Specifically, in the example shown in FIGS. 1-5, the controller 24 is in communication with the actuator 42 for vertically adjusting the aim of the photodetectors 12.

The controller 24 may be programmed to receive indication that the field of view FOV needs adjustment. For example, it may be detected that the field of view FOV is vertically offset from a horizontal position, e.g., horizon, to a degree that the field of view FOV needs to be readjusted. As an example, the field of view FOV may change when the ride-height and/or angle of the vehicle 20 change, as described above. In response to such an indication, the controller 24 adjusts the position of the photodetectors 12. For example, the controller 24 pivots the photodetectors 12 to vertically position the field of view FOV to a desired position, e.g., to a horizontal position. Specifically, the controller 24 may pivot the housing 36 relative to the casing 22, which adjusts the field of view FOV of the photodetectors 12 because the photodetectors 12 move as a unit with the housing 36. For example, the controller 24 may be programmed to power the actuator 42 to pivot the housing 36. In the example in which the actuator 42 is the motor, the actuator 42 may be powered to extend or retract the plunger to move the housing 36 relative to the casing 22.

Based on this adjustment, the controller 24 is programmed to adjust the positions of the beam-steering device 16 (vertically and optionally horizontally) to align the field of illumination FOI with the respective field of view FOV. In other words, the beam-steering device 16 is adjusted in response to adjustment of the field of view FOV to align the respective field of view FOV and the field of illumination FOI. Specifically, the field of illumination FOI may be adjusted vertically and/or horizontally to align the field of view FOV and the field of illumination FOI.

After the position of the photodetectors 12 has been set for the new vehicle 20 position as described above, the controller 24 is programmed to adjust the beam-steering device 16 and/or the position of the photodetector 12 to align the field of illumination FOI with the respective field of view FOV, i.e., adjusting the vertical positions of the field of view FOV and/or the vertical and/or horizontal position of the field of illumination FOI to align the field of view FOV and the field of illumination FOI. As one example, the controller 24 may set the position of the field of view FOV and adjust the field of illumination FOI (vertically adjustment and/or horizontal adjustment) to align the two. In addition to adjusting the beam-steering device 16 in such an example, the controller 24 may adjust the position of the photodetectors 12, e.g., +/−a predetermined angle from the set position, to align the field of view FOV with the field of illumination FOI.

As set forth above, the alignment of the field of view FOV and the field of illumination FOI may be based on maximum detection of reflected light on an object in the field of view FOV at each position of the beam-steering device 16 (i.e., the first position aimed at the first reflector 14, the second position aimed at the second reflector 14, etc.). In other words, at each position of the beam-steering device 16, the controller 24 is programmed to adjust the beam-steering device 16 (vertically and/or horizontally) and the photodetectors 12 to align the field of view FOV and the field of illumination FOI to the position that provides the maximum intensity of light reflected by an object in the field of view FOV.

In such an example, at each position of the beam-steering device 16 (e.g., the first position aimed at the first reflector 14A, the second position aimed at the second reflector 14B, etc.), the controller 24 is programmed to identify changes in intensity of light reflected by an object in the field of view FOV as the beam-steering device 16 and/or photodetector 12 are adjusted. As an example, the controller 24 may be programmed to set the position of the field of view FOV and, at each position of the beam-steering device 16, scan through various vertical and/or horizontal positions of the field of illumination FOI to identify the position of the field of illumination FOI that provides the maximum intensity of detected reflections. For example, when the beam-steering device 16 is at the first position (i.e., aimed at the first reflector 14A), the controller 24 may be programmed to scan through a range of adjustments (while maintaining a general aim at the first reflector 14) and activate the light emitter 18 during the scan. Based on the detected reflections by the first photodetector 12A, the controller 24 may be programmed to determine the setting of the beam-steering device 16 at the first position, i.e., the exact aim of the beam-steering device 16 while the beam-steering device 16 is aimed at the first reflector 14A, that provides the maximum intensity reflection. The controller 24 then uses this setting to position the beam-steering device 16 during illumination of the first field of view FOV. Similarly, the controller 24 is programmed to perform the same adjustment for the other positions/photodetectors 12.

In the example in which the position of the photodetectors 12 is also adjusted to align the field of view FOV and the field of illumination FOI, the field of view FOV may be set to several other positions and controller 24 scans through the various vertical adjustments of the field of illumination FOI at each of these positions of the field of view FOV. In addition to scanning through the various vertical adjustments of the field of illumination FOI, the controller 24 may scan through various horizontal adjustments of the field of illumination FOI. During the scanning of the various vertical adjustments of the field of view FOV and the various vertical and/or horizontal adjustments of the field of illumination FOI, the combination of the setting of the field of view FOV (i.e., the vertical angle) and the setting of the field of illumination FOI (the vertical and/or horizontal angles) that provide the maximum illumination of reflections in the field of view FOV may be identified. In other words, the controller 24 is programmed to determine the setting of the beam-steering device 16 and the photodetectors 12 that provide the maximum intensity of light reflected by an object in the field of view FOV. Once these settings are identified, the processor is programmed to adjust the beam-steering device 16 and the photodetector 12 to these settings, i.e., to center the field of illumination FOI on the field of view FOV based on the changes in intensity. In other words, the settings provide the exact aim of the field of view and field of illumination at each position (i.e., the first position aimed at the first reflector 14A, the second position aimed at the second reflector 14B, etc.).

Figure 10:
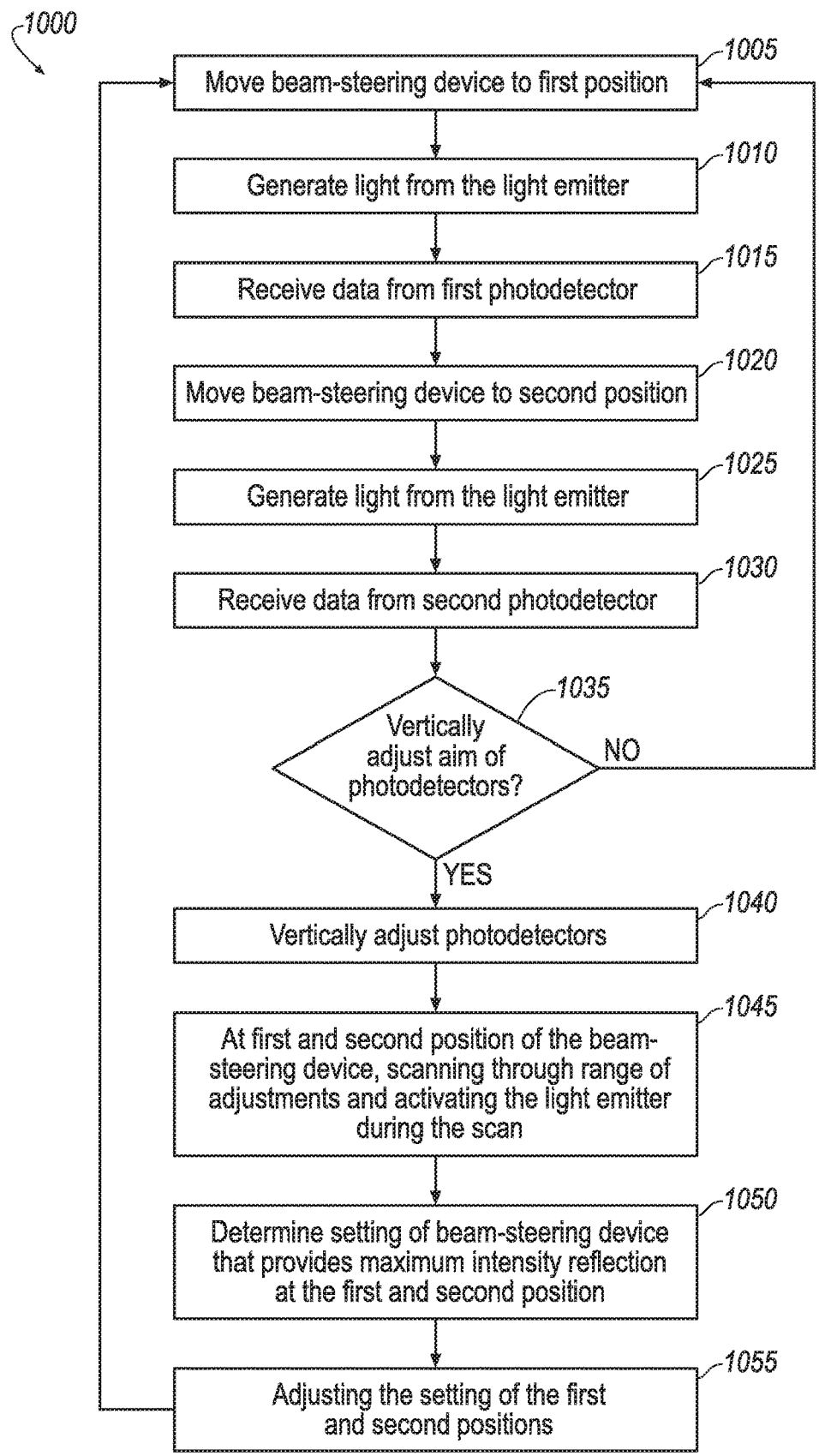
FIG. 10 is a flow chart of a method for the Lidar system.

A method 1000 of operating the examples shown in FIGS. 2-5 is shown in FIG. 10. The controller 24 may be programmed to perform the method shown in FIG. 10.

With reference to blocks 1005-1015, the method includes moving the beam-steering device 16 to the first position, generating light from the light emitter 18 while the beam-steering device 16 is in the first position to reflect the light from the first reflector 14 into the first field of illumination FOI, and receiving data from the first photodetector 12 corresponding to detected reflection of light from the light emitter 18 while the beam-steering device 16 is in the first position. With reference to blocks 1020-1030, the method includes the same steps for the beam-steering device 16 in the second position. For the examples shown in FIGS. 7A-8C, the method includes the same steps for the beam-steering device 16 in the additional positions.

The method includes repeating blocks 1005-1030 to repeatedly illuminate the field of view FOV and detect reflections alternately with the first photodetector 12 and the second photodetector 12. In other words, the method includes alternating between the first position and the second position and generating light from the light emitter 18 at each first position and second position. As set forth above, one example of alternating includes consecutively switching between the first and second positions to consecutively illuminate the first field of view FOV and the second field of view FOV, respectively, as shown in FIGS. 1-5. As another example of alternating, the beam-steering device 16 move to positions in addition to the first and second positions to aim the light from the light emitter 18 in other fields of view FOV, as shown in FIGS. 7A-8C and described further below. In examples including more than the first and second position, the first and second positions may be consecutive or may be separated by other positions, i.e., the alternative between the first field of view FOV and the second field of view FOV may not be consecutive.

Decision block 1035 includes the decision that the photodetectors 12 require vertical adjustment, as described above. If the photodetectors 12 do not require vertical adjustment, blocks 1005-1030 continue to be repeated. If the photodetectors 12 do require vertical adjustment, the photodetectors 12 are vertically adjusted and the setting of the first and second position are adjusted to align the fields of illumination FOI with the respective fields of view FOV, as shown in blocks 1040-1055. Decision block 1035 could be at any point between blocks 1005-1030.

During adjustment of the photodetectors 12, with reference to block 1035, the photodetectors 12 are vertically adjusted. For example, block 1040 may include pivoting the housing 36 relative to the casing 22, which adjusts the field of view FOV of the photodetectors 12 because the photodetectors 12 move as a unit with the housing 36. Specifically, the method may include powering the actuator 42 to extend or retract the plunger 46 to move the housing 36 relative to the casing 22. The system 10 itself may determine the desired position to be set in block and/or the desired position may be based on data and/or instruction from other components of the vehicle 20.

In block 1045, at each position of the beam-steering device 16 (e.g., the first position aimed at the first reflector 14, the second position aimed at the second reflector 14, etc.), the method includes scanning through a range of adjustments and activating the light emitter 18 during the scan.

At block 1050, for each position of the beam-steering device 16, the method includes determining the setting of the beam-steering device 16 (e.g., the exact angle of the beam-steering device 16 while the beam-steering device 16 is aimed at the first reflector 14) that provides the maximum intensity reflection at the first position and the maximum intensity reflection at the second position. Specially, at each position, the method includes activating a light emitter 18, receiving data from the photodetector 12 indicating detection of light from the light emitter 18 that was reflected by an object in a field of view FOV, and adjusting the beam-steering device 16 to vertically and/or horizontally align the field of view FOV with the field of illumination FOI. Specifically, in block 1050, the method includes setting the position of the field of view FOV and scanning through various adjustments of the field of illumination FOI. This data is used to identify the setting of the field of illumination FOI that provides the maximum intensity of detected reflections. In the examples shown in FIGS. 7A-8C, the same steps may be performed at each position of the beam-steering device 16.

At block 1055, the method includes adjusting the setting of the first and second positions. Accordingly, when steps 1005-1030 are subsequently performed, the first and second positions are set to provide maximum intensity of detected reflections in the first field of view FOV and second field of view FOV, respectively. In other words, in the first position (i.e., generally aimed at the first reflector 14A), the photodetector 12A and the beam-steering device 16 are aimed at the setting for the first position determined in block 1050, i.e., the exact angle of the photodetector 12A and beam-steering device 16. Similarly, in the second position (i.e., generally aimed at the second reflector 14B), the photodetector 12B and the beam-steering device 16 are aimed at the setting determined for the second position determined in block 1050.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a first photodetector having a first field of view and a second photodetector having a second field of view, wherein the second field of view is longer than the first field of view;
a first reflector aimed at the first field of view;
a second reflector aimed at the second field of view;
a beam-steering device movable from a first position aimed at the first reflector and a second position aimed at the second reflector;
a light emitter aimed at the beam-steering device;
a controller programmed to switch the beam-steering device between the first position and the second position and to reflect light from the light emitter in the first position and the second position and to vertically adjust the first and second fields of view and to vertically adjust the first and second positions of the beam-steering device; and
a casing and a housing pivotally supported about a horizontal axis by the casing, the housing supporting the first and second photodetectors;
wherein the light emitter is stationary relative to the casing; and
wherein the first reflector and the second reflector are stationary relative to the housing.

2. The system as set forth in claim 1, further comprising an actuator between the housing and the casing.

3. The system as set forth in claim 2, wherein the controller is programmed to instruct the actuator to pivot the first and second photodetectors.

4. The system as set forth in claim 1, wherein the beam-steering device is a micro-electro-mechanical systems mirror.

5. The system as set forth in claim 1, wherein the first reflector is a reflective diffuser and the second reflector is a reflective diffuser.

6. The system as set forth in claim 5, further comprising a first refractive diffuser and a second refractive diffuser, the first reflective diffuser aimed at the first refractive diffuser and the second reflective diffuser aimed at the second refractive diffuser.

7. The system as set forth in claim 1, further comprising a first bank of capacitors and a second bank of capacitors both in electrical communication with the light emitter.

* * * * *